United States Patent [19]
Watkins et al.

[11] Patent Number: 5,756,990
[45] Date of Patent: May 26, 1998

[54] SIMPLIFIED SIMULATION OF EFFECTS OF TURBULENCE ON DIGITAL IMAGERY

[75] Inventors: Wendell R. Watkins; Fernando R. Palacios, both of El Paso, Tex.; Daniel Billingsley; Jay B. Jordan, both of Las Cruces, N. Mex.

[73] Assignee: The United States of America as represented by the Secretary of the Army, Washington, D.C.

[21] Appl. No.: 633,712

[22] Filed: Apr. 17, 1996

[51] Int. Cl.$^6$ ............................................. G01M 11/00
[52] U.S. Cl. ........................... 250/252.1; 250/493.1; 250/495.1; 250/504 R
[58] Field of Search ..................... 250/252.1, 493.1, 250/495.1, 504 R; 364/525; 382/254, 255, 264

[56] References Cited

U.S. PATENT DOCUMENTS

| | | | |
|---|---|---|---|
| 4,692,027 | 9/1987 | MacGovern | 364/525 |
| 4,731,864 | 3/1988 | Modia | 382/264 |
| 4,792,231 | 12/1988 | Fried | 364/525 |
| 4,827,528 | 5/1989 | Macovski | 382/264 |
| 4,947,323 | 8/1990 | Smith | 382/255 |
| 5,319,213 | 6/1994 | Watkins et al. | 250/493.1 |
| 5,335,060 | 8/1994 | Gentile et al. | 250/252.1 A |
| 5,371,358 | 12/1994 | Chang et al. | 250/252.1 A |
| 5,378,890 | 1/1995 | Wes et al. | 250/252.1 A |
| 5,412,200 | 5/1995 | Rhoads | 250/201.9 |
| 5,424,783 | 6/1995 | Wong | 382/254 |
| 5,448,053 | 9/1995 | Rhoads | 250/201.9 |
| 5,471,056 | 11/1995 | Prelat | 250/252.1 A |
| 5,506,699 | 4/1996 | Wong | 382/264 |
| 5,563,721 | 10/1996 | Overton | 382/254 |

OTHER PUBLICATIONS

Wind and Refractive–Turbulence Sensing Using Crossed Laser Beams Ting–i Wang, S.F. Clifford, and G.R. Ochs; Applied Optics vol. 13 No. 11 Nov. 1974.

Sensing Refractive–Turbulence Profiles ($C_n^2$) using wave front phase measurements from Multiple reference sources Dec. 1, 1992 vol. 32, No. 34 Applied Optics.

Remote Sensing of Atmospheric Turbulence and Transverse Winds from Wave–Front Slope Measurements from Crossed Optical Paths Applied Optics Jul. 20, 1994 vol. 33 No. 21.

Review of Scientific Instruments, Wendell R. Watkins, Brent L. Beam and Peter D. Munding, vol. 65 No. 2 Feb. 1994.

Simplified Silmulation of Dynamic Effects of Atmospheric Turbulence on IR Digital Imagery, Jay B. Jordan, W.R. Watkins, F.R. Palacios and D.R. Billingsley SPIE Proceeding, vol. 2469 (Jun. 1995).

*Primary Examiner*—Constantine Hannaher
*Attorney, Agent, or Firm*—Muzio B. Roberto; Paul S. Clohan

[57] ABSTRACT

A method for approximating dynamic effects of atmospheric turbulence on infrared digital imagery utilizing the application of at least one spatially varying system to an object intensity distribution to obtain at least one image intensity distribution. The spatially varying system represents atmospheric turbulence which varies phase and/or amplitude as a function of a spatial index. The object intensity distribution and the image intensity distribution are related by an image warping transformation. Two configurations for experimental verification of the utility of a turbulence simulation technique are also disclosed.

25 Claims, 6 Drawing Sheets

OBJECT INTENSITY DISTRIBUTION
$r(n,m)$

IMAGE INTENSITY DISTRIBUTION
$s(n,m)$

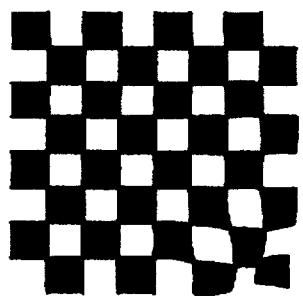
a1
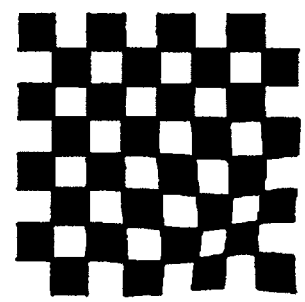
a2
b1
b2
FIGURE 5A
FIGURE 5B
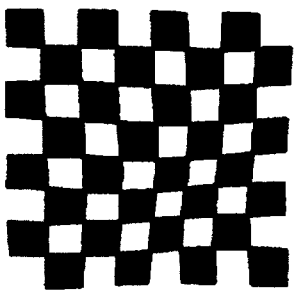
a3
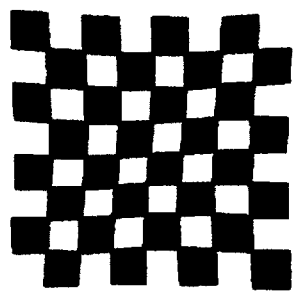
a4
b3
b4
FIGURE 5C
FIGURE 5D

FRAME 1

FRAME 7

FRAME 13

FRAME 19

SIMPLIFIED SIMULATION OF EFFECTS OF TURBULENCE ON DIGITAL IMAGERY

BACKGROUND OF THE INVENTION

1. Field of the Invention

The present invention generally relates to the simplified simulation of effects of turbulence on digital imagery, and more particularly to the simplified simulation, via a fast approximation method, of the dynamic effects of atmospheric turbulence on infrared (IR) digital imagery.

2. Description of the Prior Art

The rapid increase in the performance, and decrease in the cost, of modern computer work stations have provided the motivation for the use of high-resolution, distributed, interactive simulations not only for modern military training, but also for commercial and entertainment applications. Such simulations provide a number of remotely connected participants with a common, high-resolution, interaction environment. In tactical military simulations, a newly emerging requirement relates to development of the ability to realistically impart the appearance of a distant scene, viewed using long wavelength (8 micrometers to 12 micrometers) IR imagers equipped with high magnification telescopes, for both human and machine vision systems. On hot summer days, the dynamic effects of thermally induced atmospheric turbulence on such IR scenes is a striking phenomenon, much like that observed at visible wavelengths. The phenomena is particularly intense when observations are made over long (greater than 1 kilometer), low-altitude (less than three meters), horizontal paths typically encountered in military battlefield situations.

U.S. Pat. No. 5,319,213—Watkins et al. relates to an earlier effort to deal with thermal image degradation due to atmospheric propagation of the image radiation field. The patent discloses a thermal test target having a uniform surface temperature which can be used to characterize and measure thermal image degradation due to atmospheric propagation of the image radiation field. The thermal test target board in question produces very uniform spatial frequency patterns with near perfect transitions between hot and cold portions.

The following articles are also representative of the prior art relating to the general area of concern of the presently disclosed invention:

1. R. Hufnagel and N. Stanley, "Modulation transfer function associated with image transmission through turbulent media", *Journal of the Optical Society of America*, Vol. 56, pp. 52–61, 1964.

2. D. Fried, "Optical resolution through a randomly inhomogeneous medium for very long and very short exposures," *Journal of the Optical Society of America*, Vol. 56, pp. 1372–1379, 1966.

3. F. Roddier, "The effects of atmospheric turbulence in optical astronomy", *Progress in Optics*, E. Wolf, ed., Vol. 19, 1981.

4. M. Charnotskii, V. Myakinin, and V. Zavorotnyy, "Observation of superresolution in nonisoplanatic imaging through turbulence," *Journal of the Optical Society of America*, Vol. 7, No. 8, pp. 1345–1350, August 1990.

5. M. Charnotskii, "Anisoplanatic short-exposure imaging in turbulence," *Journal of the Optical Society of America*, Vol. 10, pp. 492–501, 1993.

6. T. Karr, "Temporal response of atmospheric turbulence compensation," *Applied Optics*, Vol. 30, pp. 363–364, 1991.

7. T. McKechnie, "Light propagation through the atmosphere and the properties of images formed by large ground-based telescopes," *Journal of the Optical Society of America*, Vol. 8, pp. 346–365, 1991.

8. D. Sadot and N. Kopeika, "Imaging through the atmosphere: practical instrumentation-based theory and verification of aerosol modulation transfer function," *Journal of the Optical Society of America*, Vol. 10, pp. 172–179, 1993.

9. P. Duffieux, *L'Intégrale de Fourier et ses Applications `a l'Optique*, Rennes, France, 1946.

10. J. Goodman, *Statistical Optics*, John Wiley & Sons, New York, N.Y., 1985.

11. V. Tatarski, *Wave propagation in a turbulent medium*, Dover Publications, New York, N.Y., 1961.

12. J. Gaskill, *Linear Systems, Fourier Transforms, and Optics*, John Wiley & Sons, New York, 1978.

13. A. Oppenheim and R. Schafer, *Digital Signal Processing*, Prentice Hall, Englewood Cliffs, N.J., 1975.

14. J. Jordan, W. Watkins, F. Palacios, and D. Billingsley, "Determination of continuous system transfer functions from sampled pulse response data," *Optical Engineering*, Vol. 33, No. 12, pp. 4093–4107, December, 1994.

15. W. Watkins, B. Bean, P. Munding, "Large area thermal target board: A new design," *Review of Scientific Instruments*, Vol. 65, No. 2, pp. 519–520, February, 1994.

16. R. Learned and A. Willsky, "A Wavelet Packet Approach to Transient Signal Classification," *Center for Intelligent Control Systems—Technical Report*, Massachusetts Institute of Technology, CICS-P-380, September, 1993.

17. T. Wang, S. F. Clifford and G. R. Ochs, "Wind and refractive-turbulence sensing using erased laser beams," *Applied Optics*, Vol. 13, No. 11, pp. 2602–2608, November, 1974.

18. B. M. Welsh, "Sensing refractive-turbulence profiles ($C_n^2$) using wave front phase measurements from multiple sources," *Applied Optics*, Vol. 31, No. 34, pp. 7283–7291, December, 1992.

19. B. M. Welsh and S. C. Koeffler, "Remote sensing of atmospheric turbulence and transverse winds from wavefront slope measurements from crossed optical paths," *Applied Optics*, Vol. 33, No. 21, pp. 4880–4888, July, 1994.

Over the past fifteen to twenty years, significant effort has been concentrated on characterizing imaging systems, the resolutions of which are reduced below their diffraction limits due to the presence of turbulence and scattering in the atmosphere. The subject areas of long and short exposure atmospheric optical transfer functions and the resolution problem have been studied by Hufnagel and Stanley (reference 1 above), Fried (reference 2), Roddier (reference 3), Charnotskii et al (references 4 and 5), Karr (reference 6), McKechnie (reference 7), Sadot and Kopeika (reference 8), and many others.

An atmospheric optical transfer function (AOTF) can be considered a modification of the traditional optical transfer function used in Fourier Optics introduced by Dufflieux (reference 9) in the 1940's. The pupil function of the optical system is replaced by the pupil function multiplied by the atmospheric transmittance, as discussed by Goodman (reference 10). In most studies, the AOTF is calculated by a statistical averaging method for both long and short time exposures. In such studies (e.g., those of Tatarski—reference 11, Hufnagel and Stanley—reference 1, Fried—reference 2, and Goodman—reference 10), the turbulence model is assumed over the entire optical path. Recently, Charnotskii et al. (reference 4) have presented a theoretical development and the results of an experiment in which turbulence is modeled as a thin distant phase screen, permitting derivation of an instantaneous optical transfer function without statistical averages. The result of the efforts of Charnotskii et al illustrate how the presence of the thin turbulent layer, under certain conditions, can increase the resolution of a telescope beyond its diffraction limit. The theoretical development in Charnotskii's work forms the basis for an efficient approximation method for directly simulating the dynamic effects of atmospheric turbulence on digital IR or visible images. The theory is introduced in the standard notation of Fourier Optics (see Gaskill—reference 12), and is developed in the notation of digital signal processing (see Oppenheim and Schafer—reference 13) for implementation by those directly involved in digital simulations. Additional detail concerning the notational procedure is found in Jordan (reference 14).

FIG. 1 is a diagrammatic representation of the basic configuration of the experiment presented by Charnotskii et al. (reference 4). The basic configuration 10 of the experiment comprises an object 12, a phase screen 14, and a lens 16, resulting in realization of an image 18. The dynamic IR case considered in the context of this experiment is the short exposure, incoherent imaging of a self-luminous object 12 through a turbulent atmosphere, the latter being represented by phase screen 14. "Short exposure" means that the imaging frame capture and processing times of the system are short compared to the correlation time scale associated with the turbulence phenomena. The self-luminous object 12 is in the plane $z=z_1$, the optical center of lens 16 of the system 10 is at $z_2$, and the image is formed at $z_3$. In general, the turbulence phenomena occurs throughout the volume between planes $z_1$ and $z_2$. A major simplifying assumption is that the turbulence phenomena is restricted to a relatively thin region at $z_s$. Other assumptions used in this development are that the distances between $z_1$ and $z_2$, between $z_1$ and $z_s$, and between $z_2$ and $z_3$, and the smallest spatial features in the phase screen 14, are very large relative to the IR wavelength. Typically, the distance between $z_1$ and $z_2$ is of the order of hundreds of meters, while the distance between $z_1$ and $z_s$ ranges in the order of tens of centimeters to hundreds of meters, and the distance between $z_2$ and $z_3$ and the smallest spatial features in the phase screen 14 are on the order of tens of centimeters. On the other hand, the longest IR wavelengths being considered are on the order of tens of micrometers.

SUMMARY OF THE INVENTION

The present invention generally relates to a simplified simulation, via a fast approximation method, of the dynamic effects of atmospheric turbulence on IR digital imagery.

More particularly, the present invention is based on a distant phase screen approximation for certain turbulent conditions. The computational efficiency of the method and arrangement of the present invention permits realistic incorporation of the atmospheric turbulence effects in high-resolution, interactive, simulation environments for both military and commercial applications. Simulations of turbulence effects on digital IR images are presented, together with actual images obtained from a commercial IR system imaging through thermally induced atmospheric turbulence. Experimental configurations for verifying the utility of such simulation techniques are also disclosed herein.

Therefore, it is a primary object of the present invention to provide for the simplified simulation of effects of atmospheric turbulence on IR digital imagery.

It is an additional object of the present invention to provide a fast approximation method for simulating the dynamic effects of atmospheric turbulence on IR digital imagery.

It is an additional object of the present invention to provide experimental configurations for verifying the utility of such simulation techniques.

The above and other objects, and the nature of the invention, will be more clearly understood by reference to the following detailed description, the accompanying drawings, and the appended claims.

BRIEF DESCRIPTION OF DRAWINGS

FIGS. 5A–5D are graphical illustrations of a simulation of a dissipating disturbance in the presence of constant velocity wind (upper portions of the figures) and of the approximate size, position and orientation of the disturbance (lower portions of the figures).

DETAILED DESCRIPTION

Figure 1:
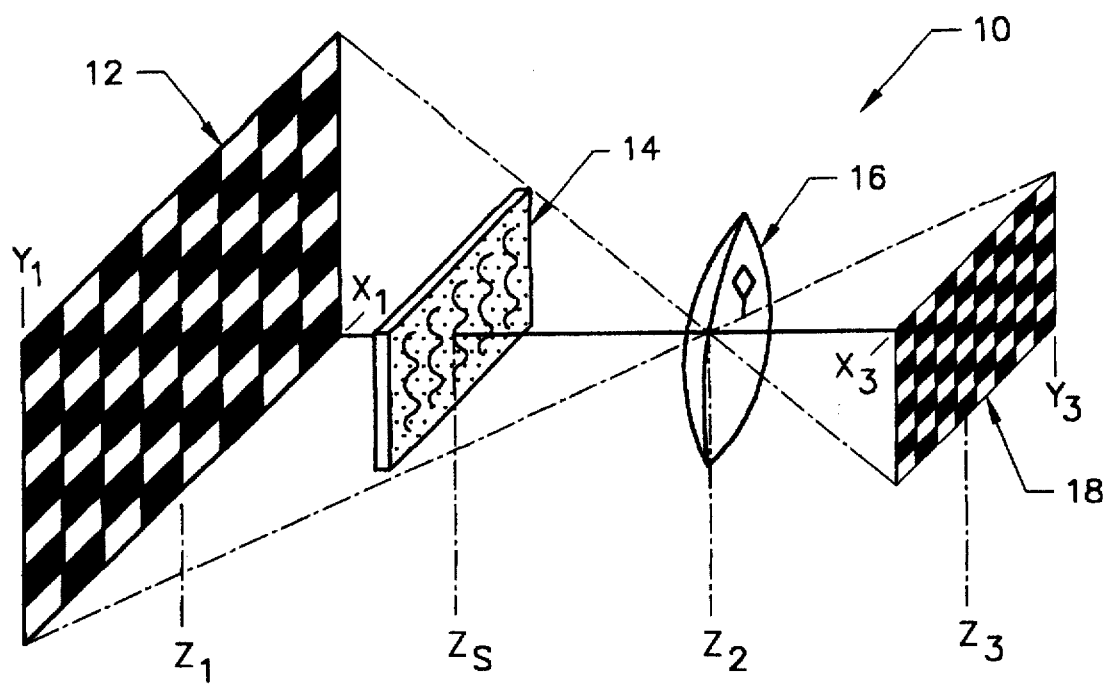
FIG. 1 is a diagrammatic representation of a basic configuration of an experiment conducted in the prior art.

The invention will now be described in more detail with reference to the various figures of the drawings.

When the image of an object is recorded with an exposure time (capture and processing time) that is short compared to the correlation time of image fluctuations due to the turbulence, the corresponding spatial distribution of the intensity of the captured image I ($x_3$, $y_3$) is related to the intensity distribution of the object O($x_1$, $y_1$) by equation (1) as follows:

$$I(x_3,y_3) = \int \int O(x_1,y_1) P\left(x_3 + \frac{z_{23}}{z_{12}} x_1, y_3 + \frac{z_{23}}{z_{12}} y_1, x_1, y_1\right) dx_1 dy_1,$$

where $x_i$, $y_i$ are the coordinates in the ith plane and P(*) is a temporally instantaneous point spread function valid at the instant the image I(*) was captured. P(*) describes the spatially varying effect in the inhomogeneous index of refraction through the volume between planes $z_1$ and $z_2$. The spatial variation of the point spread function with respect to the coordinates of both the object and the image is commonly referred to as the nonisoplanatic case. In contrast, when the system is spatially invariant (isoplanatic), the image intensity distribution is related to the object distribution by a simple convolution, $I(x,y)=O(x,y)* P(x,y)$ where the coordinates x, y are scaled appropriately for either the object or the image to account for the optical magnification and inversion. The spatially stationary P(*) contains the appropriate multiplicative coefficients to properly relate the two intensities.

Some insight into the effects of the spatial non-stationarity of the system is gained by examining the Fourier transform of the image intensity distribution, the Fourier transforms of the image intensity and of the instantaneous, spatially varying, point spread functions are as shown in equations (2) and (3) as follows:

$$I(\xi,\eta) = \int \int I(x_3,y_3)\, e^{-j2\pi(x_3\xi+y_3\eta)}dx_1 dy_1, \tag{2}$$

$$P(\xi,\eta,x_1,y_1) = \int \int P\left(x_3'=x_3+\frac{z_{23}}{z_{12}}x_1, y_3'=y_3+\frac{z_{23}}{z_{12}}y_1, x_1, y_1\right) e^{-j2\pi(\xi x_3'+\eta y_3')}dx_3' dy_3'. \tag{3}$$

The Fourier transform of the spatially varying point spread function is a spatially varying Fourier transform describing a different complex frequency function for each point in the object plane. The Fourier transform of the image is related to the spatial intensity of the object and the spatially varying Fourier transform of the point spread function by equation (4) as follows:

$$\bar{I}(\xi,\eta) = \iint O(x_1,y_1)\bar{P}(\xi,\eta,x_1,y_1)e^{-j2\pi(\xi x_1+\eta y_1)}dx_1 dy_1. \tag{4}$$

development continues by taking the Fourier transform of P(*) with respect to the object spatial coordinates to obtain a two-frequency transfer function, and by introducing the phase screen and an optical transfer function of a typical telescope.

The approximation method of the present invention has been developed based on the following analysis. In image simulation or analysis applications, the continuous image I(*) is not available. In simulation applications, a sampled version of I(*) is generated while, in analysis applications, a sampled version of I(*) is acquired by an analog-to-digital converter (ADC) in the imaging system. In either case, it is considered to be of interest to apply the developments summarized above to the sampled image data set using the methods and notation of digital signal processing.

With the latter statement in mind, let $I_s(x_3, y_3)$ be the ideal comb function sampled version of $I(x_3, y_3)$, with samples spaced apart by $x_{3s}$ in the $x_3$ direction and spaced apart by $y_{3s}$ in the $y_3$ direction. That is:

$$I_s(x_3,y_3) = \sum_{n=-\infty}^{\infty} I(nx_{3s},my_{3s})\delta(x_3-nx_{3s},y_3-my_{3s}). \tag{5}$$

simplify the notation, the development is one-dimensional along one of the rows of the discrete image $I_s(x_3, y_3)$. The sampled image has non-zero values which are possible only at points $nx_{3s}$, $my_{3s}$. The values along the $m_0$th row are $I_s(nx_{3s}, m_a y_{3s})$. In digital signal processing notation, it is customary to drop the explicit dependence on the sample interval, in this case $x_{3s}$. Since only one row is being characterized, the y or column dependence is also dropped, giving the row signal $s(n)=I_s(nx_{3s},m_o y_{3s})$. The same arguments apply to a discrete data set obtained by sampling the object intensity distribution, giving the object row signal $r(n)=O_s(nx_{1s},m_o y_{1s})$. The sample intervals $x_{1s}$ and $X_{3s}$ are signed and scaled to account for the optical inversion and magnification, so that both the object and the image have the same spatial extent and n corresponds. In a homogeneous atmosphere (the isoplanatic case), the effect of the atmosphere and the optics are the same regardless of the position along the row. In this shift invariant case, the image row is related to the object row through a simple convolution: $s(n)=r(n)*h(n)$, where $h(n)$, defined as the unit sample response, is the discrete counterpart to the point spread function P(*) in the continuous optical system summarized earlier. However, the case of interest is that in which h(*) is not a single function applicable at all row positions, but rather is a family of functions, one for each position along the row.

Figure 2:
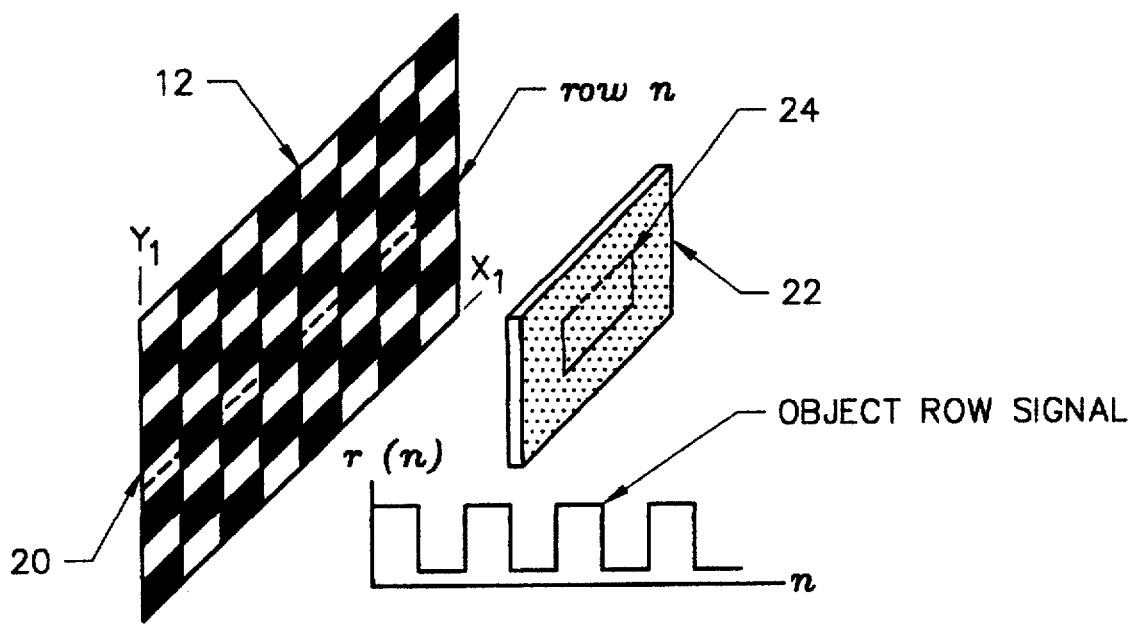
FIG. 2 is graphical illustration of an object row signal from the experimental arrangement of FIG. 1.

The following example illustrates the effect of a spatially varying unit sample response. In the regard, FIG. 2 depicts an object row signal derived from the original experimental arrangement of FIG. 1. The screen 22 is modified to affect phase and/or amplitude. It introduces a spatially varying disturbance over a portion of the system. Possible effects of the disturbance are illustrated by three simple spatially varying systems, each described by a set of finite difference equations, unit sample responses, and frequency responses, together with regions of applicability with respect to the n-space of the object intensity signal r(n). The three simple spatially varying systems appear in Table A below.

Figure 3:
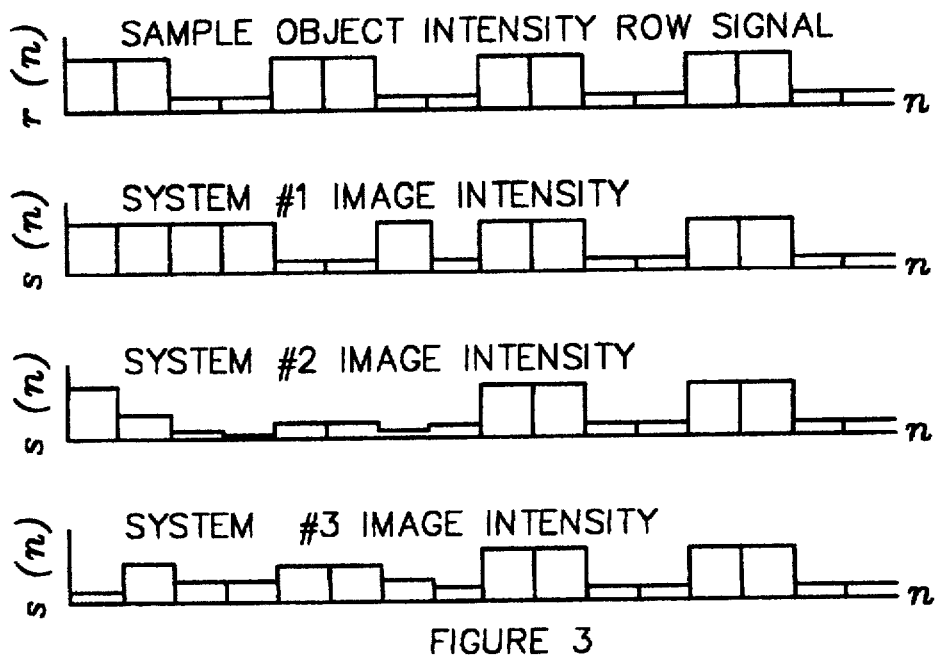
FIG. 3 is a series of graphical representations of the effects of spatially varying systems on an object intensity distribution.

FIG. 3 is a series of graphical representations of the effects of spatially varying systems on an object intensity distribution. The top row of FIG. 3 shows a sampled row across the checkerboard object intensity distribution with two samples per checker. The second row of FIG. 3 is graph of the result of applying the spatially varying system #1 to the object intensity distribution. In system #1, the disturbance of the screen varies only the phase as a function of the spatial index with respect to the object intensity signal. This variation, however, has a dramatic effect on the spatial frequencies of the image intensity of the checkerboard pattern. The first bright square is greatly expanded, lowering its fundamental spatial frequency. The second bright square is compressed to one sample, increasing its fundamental spatial frequency. This is a phase/frequency modulating system.

System #2 varies only the amplitude as a function of the spatial index. The response to system #2 is shown in the third row of FIG. 3, and alters the relative amplitudes of the checkers, but does not expand or compress their spacing. This is an amplitude modulating system. The spatially varying nature of system #2 also introduces spatial frequency components that were not present in the original object intensity distribution.

System #3 is shown in the bottom of the fourth row of FIG. 3, and is a spatially varying low pass filter. It has the effect of reducing the high spatial frequency components of the checkerboard pattern, a rounding of the sharp transitions. The filter of system #3 has the properties of an original shift in variant filter in that it changes the amplitude and phase of frequency components existing in the original object intensity distribution. The spatially varying aspects of this filter also alter both the phase and amplitude as a function of spatial index n with respect to the object intensity signal, converting some spatial frequencies to others, and introducing spatial frequencies that were not present in the original object intensity $$S(e^{j\omega}) = \sum_{n=-\infty}^{\infty} r(n) H_n(e^{j\omega}) e^{-j\omega n}. \tag{9}$$

TABLE A

| Difference Equations | Unit Sample Responses | Frequency Responses | Region of Applicability |
|---|---|---|---|
| System #1: | | | |
| $s(n) = r(n)$, | $h_0(n) = \delta(n)$, | $H_0(e^{j\omega}) = 1$, | $n \leq 0$; |
| $s(n) = r(n-1)$, | $h_1(n) = \delta(n-1)$, | $H_1(e^{j\omega}) = e^{-j\omega}$, | $n = 1$; |
| $s(n) = r(n-1)$, | $h_2(n) = \delta(n-1)$, | $H_2(e^{j\omega}) = e^{-j\omega}$, | $n = 2$; |
| $s(n) = r(n-2)$, | $h_3(n) = \delta(n-2)$, | $H_3(e^{j\omega}) = e^{-j2\omega}$, | $n = 3$; |
| $s(n) = r(n-2)$, | $h_4(n) = \delta(n-2)$, | $H_4(e^{j\omega}) = e^{-j2\omega}$, | $n = 4$; |
| $s(n) = r(n-2)$, | $h_5(n) = \delta(n-2)$, | $H_5(e^{j\omega}) = e^{-j2\omega}$, | $n = 5$; |
| $s(n) = r(n-1)$, | $h_6(n) = \delta(n-1)$, | $H_6(e^{j\omega}) = e^{-j\omega}$, | $n = 6$; |
| $s(n) = r(n)$ | $h_7(n) = \delta(n)$, | $H_7(e^{j\omega}) = 1$, | $n \geq 7$. |
| System #2: | | | |
| $s(n) = r(n)$, | $h_0(n) = \delta(n)$, | $H_0(e^{j\omega}) = 1$, | $n = 0$; |
| $s(n) = \frac{1}{2}r(n)$, | $h_1(n) = \frac{1}{2}\delta(n)$, | $H_1(e^{j\omega}) = \frac{1}{2}$, | $n = 1$; |
| $s(n) = \frac{1}{2}r(n)$, | $h_2(n) = \frac{1}{2}\delta(n)$, | $H_2(e^{j\omega}) = \frac{1}{2}$, | $n = 2$; |
| $s(n) = \frac{1}{4}r(n)$, | $h_3(n) = \frac{1}{4}\delta(n)$, | $H_3(e^{j\omega}) = \frac{1}{4}$, | $n = 3$; |
| $s(n) = \frac{1}{4}r(n)$, | $h_4(n) = \frac{1}{4}\delta(n)$, | $H_4(e^{j\omega}) = \frac{1}{4}$, | $n = 4$; |
| $s(n) = \frac{1}{4}r(n)$, | $h_5(n) = \frac{1}{4}\delta(n)$, | $H_5(e^{j\omega}) = \frac{1}{4}$, | $n = 5$; |
| $s(n) = \frac{1}{2}r(n)$, | $h_6(n) = \frac{1}{2}\delta(n)$, | $H_6(e^{j\omega}) = \frac{1}{2}$, | $n = 6$; |
| $s(n) = r(n)$ | $h_7(n) = \delta(n)$, | $H_7(e^{j\omega}) = 1$, | $n \geq 7$. |
| System #3: | | | |
| $s(n) = r(n)$, | $h_0(n) = \delta(n)$, | $H_0(e^{j\omega}) = 1$, | $n = 0$; |
| $s(n) = \frac{1}{4}r(n+1) + \frac{1}{2}r(n) + \frac{1}{4}r(n-1)$, | $h_1(n) = \frac{1}{4}\delta(n+1) + \frac{1}{2}\delta(n) + \frac{1}{4}\delta(n-1)$, | $H_1(e^{j\omega}) = \frac{1}{2} + \frac{1}{2}\cos\omega$, | $n = 1$; |
| $s(n) = \frac{1}{4}r(n+1) + \frac{1}{2}r(n) + \frac{1}{4}r(n-1)$, | $h_2(n) = \frac{1}{4}\delta(n+1) + \frac{1}{2}\delta(n) + \frac{1}{4}\delta(n-1)$, | $H_2(e^{j\omega}) = \frac{1}{2} + \frac{1}{2}\cos\omega$, | $n = 2$; |
| $s(n) = \frac{1}{3}r(n+1) + \frac{1}{3}r(n) + \frac{1}{3}r(n-1)$, | $h_3(n) = \frac{1}{3}\delta(n+1) + \frac{1}{3}\delta(n) + \frac{1}{3}\delta(n-1)$, | $H_3(e^{j\omega}) = \frac{1}{3} + \frac{2}{3}\cos\omega$, | $n = 3$; |
| $s(n) = \frac{1}{3}r(n+1) + \frac{1}{3}r(n) + \frac{1}{3}r(n-1)$, | $h_4(n) = \frac{1}{3}\delta(n+1) + \frac{1}{3}\delta(n) + \frac{1}{3}\delta(n-1)$, | $H_4(e^{j\omega}) = \frac{1}{3} + \frac{2}{3}\cos\omega$, | $n = 4$; |
| $s(n) = \frac{1}{3}r(n+1) + \frac{1}{3}r(n) + \frac{1}{3}r(n-1)$, | $h_5(n) = \frac{1}{3}\delta(n+1) + \frac{1}{3}\delta(n) + \frac{1}{3}\delta(n-1)$, | $H_5(e^{j\omega}) = \frac{1}{3} + \frac{2}{3}\cos\omega$, | $n = 5$; |
| $s(n) = \frac{1}{4}r(n+1) + \frac{1}{2}r(n) + \frac{1}{4}r(n-1)$, | $h_6(n) = \frac{1}{4}\delta(n+1) + \frac{1}{2}\delta(n) + \frac{1}{4}\delta(n-1)$, | $H_6(e^{j\omega}) = \frac{1}{2} + \frac{1}{2}\cos\omega$, | $n = 6$; |
| $s(n) = r(n)$ | $h_7(n) = \delta(n)$, | $H_7(e^{j\omega}) = 1$, | $n \geq 7$. | distribution. A filter that is not spatially varying can affect only the amplitude and phase of frequency components existing in the original object intensity distribution, and it cannot convert one spatial frequency to another, or introduce new spatial frequencies, as can spatially varying systems.

The relationship between the sampled image intensity and the sampled object intensity is given in Equation (6) below, which is the discrete counterpart to Equation (1) above:

$$s(n) = \sum_{k=-\infty}^{\infty} h_n(k) r(n-k), \tag{6}$$

where $s(*)$ corresponds to $I(*)$, $r(*)$ corresponds to $O(*)$, and $h_n(*)$ corresponds to $P(*)$. It is important to note that the subscript n on $h_n(*)$ is relative to the object intensity image, while the argument n of $s(*)$ is relative to the image intensity signal. The Fourier transforms of the image intensity distribution and of the family of spatially varying unit sample responses are given by equations (7) and (8) below:

$$S(e^{j\omega}) = \sum_{n=-\infty}^{\infty} s(n) e^{-j\omega n}, \text{ and} \tag{7}$$

$$H_n(e^{j\omega}) = \sum_{k=-\infty}^{\infty} h_n(k) e^{-j\omega k}. \tag{8}$$

The $H_n(e^{j\omega})$ are termed the spatially instantaneous frequency response functions. In terms of these, and the original object intensity distribution $r(*)$, the Fourier transform of the image intensity $S(e^{j\omega})$ is as follows:

This is the discrete counterpart to Equation (4) above. Thus far in the latter development, $H_n(e^{j\omega})$ is treated as a family of frequency response functions, one for each spatial position along the row of the object intensity distribution. This family of one-dimensional functions of $\omega$ can also be viewed as a two-dimensional function, $H(\omega,n)$, that varies with both $\omega$ and n. In general, $H(\omega,n)$ is complex, and can be expressed in polar form as $A(\omega,n)e^{j\phi(\omega,n)}$. When $\phi(\omega,n)=0$, the amplitude is varying spatially, as illustrated by system #2 discussed above. When $A(\omega,n)=1$ and $\phi(*)$ is not equal to zero, the phase is varying spatially, as illustrated by system #1. The image warping family of transformations widely used in computer graphics is made up of members of the spatially varying phase systems, and, as such, it describes some of the distortions possible from the phase screen 14 of FIG. 1. The image warping transformations relate the image intensity distribution to the object intensity distribution by the equation $s(n)=r(n+\mu(n))$.

Although the temporally instantaneous effect of thermally induced atmospheric turbulence in the narrow phase screen region is the result of both a phase and amplitude varying process, the principle image distorting mechanism is the spatial variation of phase. Consequently, $s(n)=r(n+\psi(n))$ is a good candidate for an efficient proximation of the effect of turbulence, especially for systems with relatively low spatial resolution, such as the eight-micrometer to twelve-micrometer IR imagers currently in use. Atmospheric physical constraints require that $\psi(n)$ be continuous in the first derivative. For the lower resolution imaging systems, high spatial frequency structures associated with the turbulence can be ignored, allowing the phenomenon in the distant phase screen region to be modeled as an ellipsoid or combination of ellipsoids. The first derivative of the Gaussian distortion function has all of these desirable properties, and was chosen for the initial model. In one dimension, this warping transformation is represented by the following equation:

$$s(n) = r(n + \psi(n)) = r\left(n + \beta(n - n_0)e^{\frac{-(n-n_0)^2}{\sigma_n^2}}\right), \quad (10)$$

where $\beta, n_o$ and $\sigma_n$ are the adjustable parameters. The parameter $\beta$ controls the magnitude of the disturbance, and is roughly proportional to the peak deviation of the index of refraction in the disturbed region from that in the surrounding homogeneous region. When the sign of $\beta$ is positive, the refractive effect is similar to that of a weak convex lens. This occurs when the temperature is lower in the disturbance region than in the surrounding region. When the sign of $\beta$ is negative, the opposite effect results, that is, the effect is that of a weak concave lens. The parameter $n_o$ is the position of the center of the disturbance, the point of peak deviation of the refractive index. The parameter $\sigma_n$ controls the spatial extent of the disturbance, and is related to the spatial scale of the turbulence. These parameters are referenced to the image intensity distribution, and include the physical geometry of the overall system, including the optics. In two dimensions, the first derivative of a bivariate Gaussian function with respect to each spatial variable is used as the image warping function, as represented by the following equations:

$$s(n,m) = r(n + \psi_n(n,m),m + \psi_m(n,m)) = \quad (11)$$

$$r(n - \beta(n - n_0) - \rho(m - m_0))e^Q, m - \beta(m - m_0 - \rho(n - n_0))e^Q),$$

$$Q = \frac{-(n-n_0)^2}{\sigma_n^2} + \frac{\rho(n-n_0)(m-m_0)}{\sigma_n \sigma_m} + \frac{-(m-m_0)^2}{\sigma_m^2}.$$

Figure 4A:
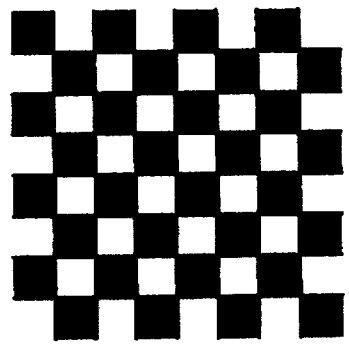
FIGS. 4A and 4B are diagrammatic representations of an object intensity distribution and an image intensity distribution, respectively, illustrating the effect of two-dimensional spatial warping.
Figure 4B:
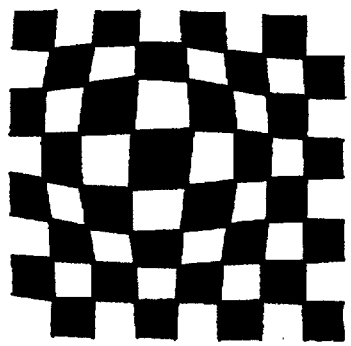

In addition to the adjustable parameters in the n and m directions, there is an additional parameter $\rho$ that determines the slope of the disturbance. The Gaussian warping function is similar to the bivariate normal probability density function, but does not have normalization with respect to variance or correlation coefficient. Application of this warping function with $\beta$ positive (the convex effect) to the checkerboard pattern is shown in FIGS. 4A and 4B, which are diagrammatic representations of the object intensity distribution and the image intensity distribution, respectively.

Several dynamic effects are easily incorporated into equation (11). Constant wind velocity is incorporated by replacing the static positions of the disturbance $n_o$ and $m_o$ with the x and y wind velocity components in the plane of the phase screen 14, appropriately scaled for the imaging frame rate $\tau$ and the position of the image plane. The parameter $n_o$ is replaced by $n_o + \alpha_n \tau$ and $m_o$ is replaced by $m_o + \alpha_m \tau$.

The z component of the wind velocity changes the scale factors $\sigma_n$ and $\sigma_m$ to $\sigma_n + \alpha_z \tau$ and $\sigma_m + \alpha_z \tau$, respectively. These either increase or decrease, depending on whether or not the disturbance is moving toward or away from the imager. Thermal mixing and/or dissipation alter the $\beta$ parameter and can also alter $\sigma_n$ and $\sigma_m$ as functions of the imaging frame rate. Curl in the wind velocity vector field can alter the $\rho$ parameter.

FIGS. 5A–5D are diagrammatic representations of a simulated disturbance sequence. The upper portions of each of FIGS. 5A–5D represent four frames simulating a dissipating disturbance in the presence of constant velocity wind with components in all three directions and with movement toward the imager. The temperature in the region of the disturbance is greater than that of the surrounding air (that is, the parameter $\beta$ is negative).

The lower portions of FIGS. 5A–5D show the approximate size, position and orientation of the disturbance, the latter being represented by ellipses in each of the figures. Line thickness indicates the relative strength of the disturbance, and thus the disturbance b1 is greater than the disturbance b2, which is greater than the disturbance b3, which is in turn greater than the disturbance b4.

Figure 6:
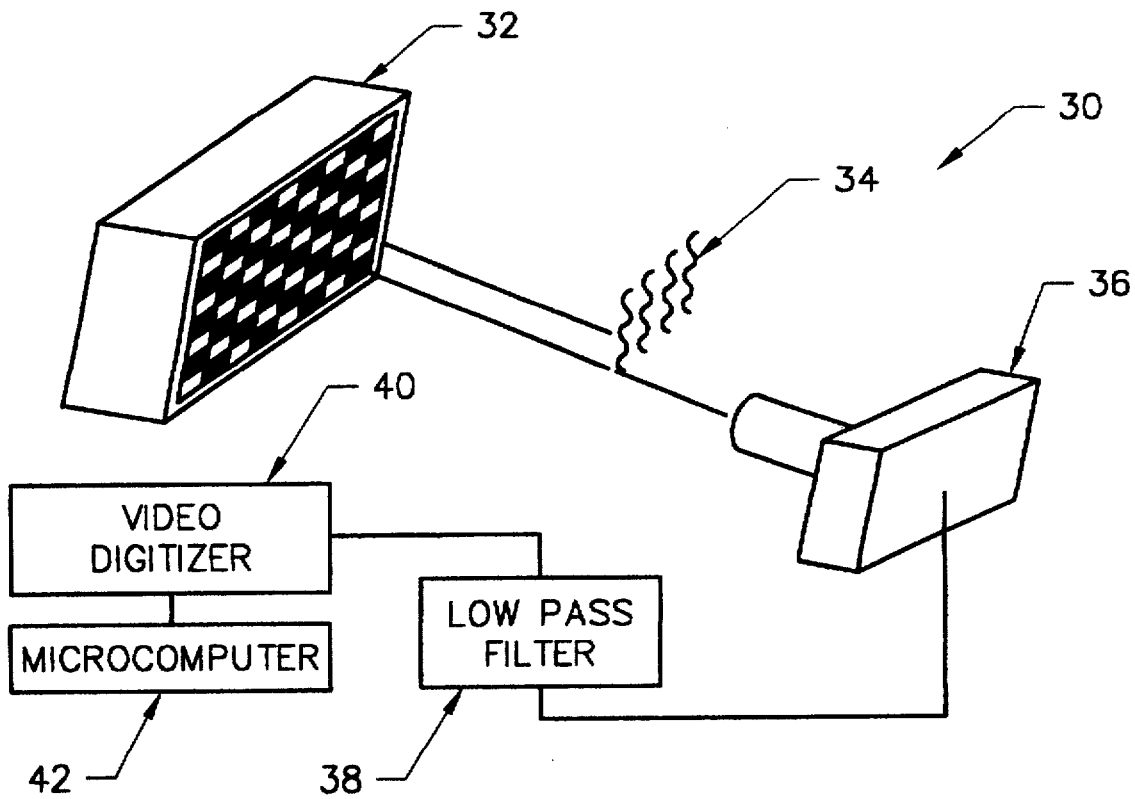
FIG. 6 is a diagrammatic representation of an arrangement used to verify the utility of the simulation approach or technique employed in the present invention.

The utility of the simulation approach described herein has been verified by field experiments using commercially available IR imaging systems. FIG. 6 is a diagrammatic representation of the experimental configuration utilized to verify the utility of the simulation approach. As seen therein, the experimental configuration 30 comprises a thermal target board 32 disposed in opposition to an IR imager 36 with a heat source disturbance 34 disposed between the target board 32 and the imager 36. The configuration 30 further comprises a low pass filter 38 connected to the output of the imager 36, a video digitizer connected to the output of low pass filter 38, and a microcomputer 42 connected to the output of video digitizer 40.

In a preferred embodiment of the configuration 30, the heat source disturbance 34 is located at the mid-point between the target board 32 and the imager 36; for example, the target board 32 and the imager 36 are spaced apart by a distance of 550 meters, with the heat source disturbance 34 being located at the 275-meter position.

Thermal target board 32 is, preferably, implemented by the large area thermal target board described in U.S. Pat. No. 5,319,213—Watkins et al. The thermal target board 32 is, preferably, equipped with an 8-by-8 checkered pattern. Each of the alternating apertures in the pattern is a square measuring 203 mm by 203 mm. The structures forming the checkered pattern are preferably protected with solar and wind shielding.

In a preferred embodiment, the target board 32 and imager 36 are less than two meters above ground, and are separated by 550 meters. As previously mentioned, the disturbance-generating heat source 34 is placed midway between the target 32 and imager 36 just outside the lower right-hand corner of the field of view. The experiment is typically performed early on a cool day, when very little atmospheric turbulence is occurring along the horizontal path.

Imager 36 can be implemented by a Model 610 IR imager manufactured by Inframetrics, but can be any conventional IR imager having the characteristics and functions described herein. In a first experiment, the long wavelength (8–12 micrometer) portion of the imager 36 was used with a 10× telescope as the imaging system.

The low pass filter 38 can be implemented by a Model VSA-275-H low pass filter manufactured by Mathey Electronics, although any conventional low pass filter having the characteristics disclosed herein can be used. The low pass filter 38 acts as an anti-aliasing filter having the following specifications passband edge: −0.25 db at 2.75 MHz; −3 db point: 3 MHz; −12 db point: 3.29 MHz; stopband: −45 db beginning at 3.77 MHz.

Video digitizer 40 can be any conventional video digitizer having the characteristics and functions described herein. Preferably, video digitizer 40 is a Model PFG+640 video digitizer manufactured by Imaging Technology. The video digitizer 40 acquires 8-bit samples at 12.3356 million samples per second (MSPS) in a preferred embodiment. Moreover, the video digitizer 40 preferably has an adjustable video gain and offset allowing the system to be adjusted for maximum signal-to-equivalent-quantization-noise ratio.

In operation of the experimental configuration 30, the heat source disturbance 34 reduces the size (increases the spatial frequency) of each checkered pattern appearing on target board 32 and passing through the heat source disturbance 34. Because of the range and magnification, imager 36 is operating at the edge of its spatial frequency response. This results in a principal observed effect of reduction in the apparent temperature difference between hot and cold spots on target board 32.

Figure 7:
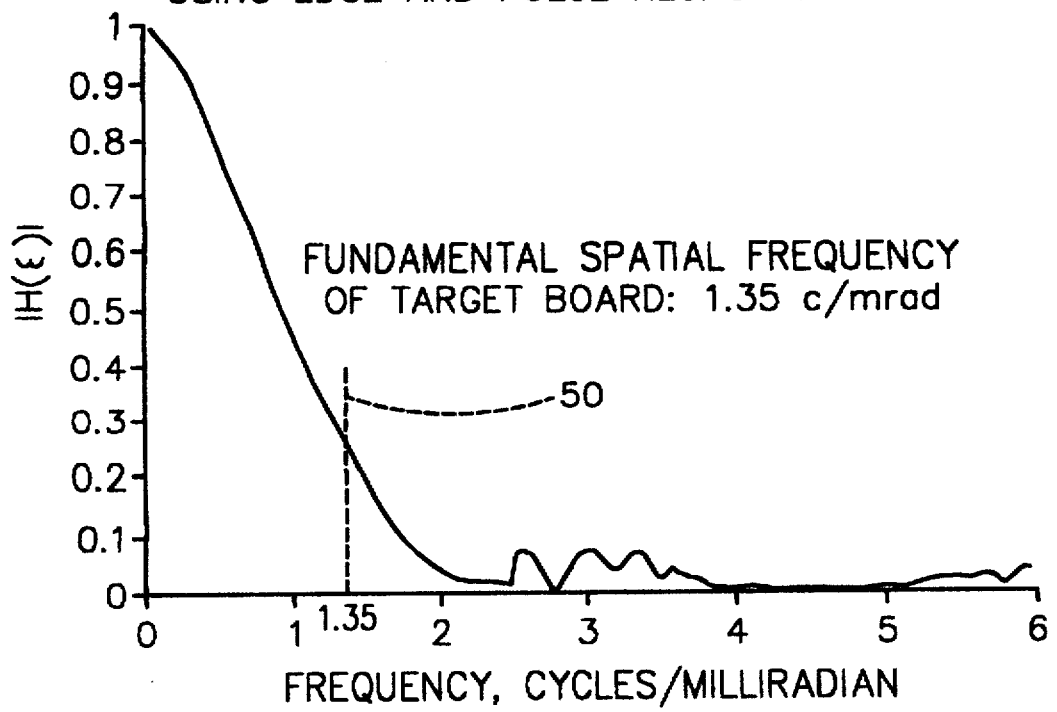
FIG. 7 is a graphical illustration of the magnitude frequency response (MTF) of the IR imager using edge and pulse response methods.
Figure 8A:
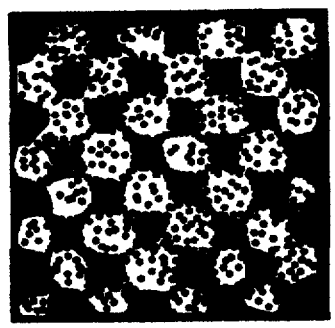
FIGS. 8A–8D are graphical illustrations of four digitized images (upper portions of the figures) and their reconstructed patterns (lower portions of the figures) for various sequential frames.
Figure 8A:
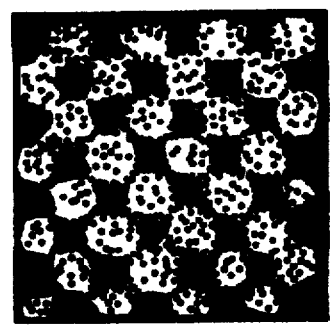
Figure 8A:
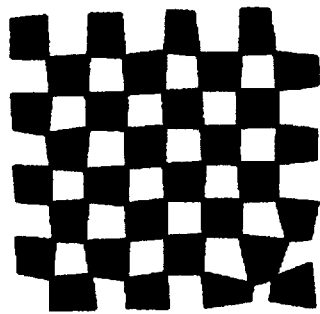
Figure 8B:
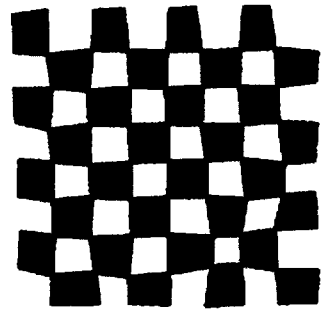
Figure 8C:
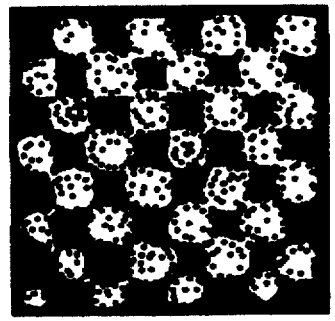
Figure 8C:
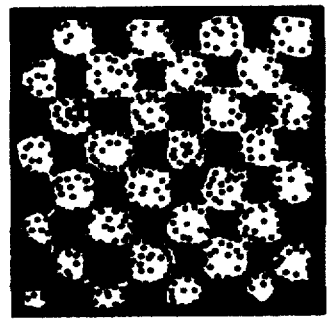
Figure 8C:
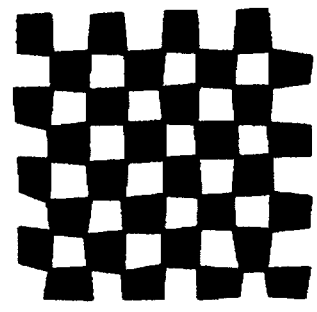
Figure 8D:
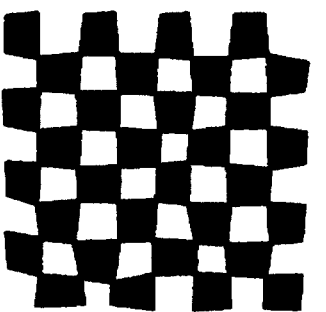

FIG. 7 is a graphical representation or plot of the magnitude frequency response (MTF) of the IR imager 36, using edge and pulse response methods. Thus, FIG. 7 shows the MTF of the imager 36 along the horizontal direction. The two-dimensional MTF is not radially symmetric, but it is nearly the same in the horizontal and vertical directions, and is approximately rectangularly symmetric. The fundamental spatial frequency of the checkered target 32 at this range is 1.35 cycles/mrad in both directions. This frequency is marked on the MTF plot by dotted line 50 so as to give an indication of the quiescent operating point when no disturbance is present. In general, a full wavelet packet transform is an excellent method for characterizing the non-stationary behavior of the progressive movement of the distortion. In this constrained experiment, however, a partial wavelet packet transform gives considerable information as to the strength and position of the non-stationary point spread function. Because of the large distance between the heat source disturbance 34 and the imager 36 (as mentioned above, 275 meters) and the relatively small size of the heated plume, it is not expected that disturbances will significantly alter the overall observed position of the target board 32. Computation of wavelet packet coefficients is required only for the positions of each bright checker when no distortion is present.

FIGS. 8A–8D are representations of digital IR images and their reconstructed patterns resulting from operation of the experimental configuration 30 of FIG. 6. More specifically, the upper portions of each of FIGS. 8A–8D are four digitized images from a sequence captured using the experimental configuration 30 of FIG. 6. The image sequence was captured at a frame rate of 30 frames per second. The images shown are six frames apart, giving a time lapse of 200 ms between each image in FIGS. 8A–8D. Referring to FIG. 6, the heat source disturbance 34 was introduced just below the lower right corner of the target board 32, and the disturbance 34 propagated upward to the left and toward the imager 36, growing and dissipating as time progressed. This can be seen by viewing the upper portions of FIGS. 8A–8D, and it can be seen that, by the time of frame 19 (FIG. 8D, upper portion), the disturbing effect had spread and weakened considerably.

The lower portions of each of FIGS. 8A–8D represent the reconstruction of the corresponding distorted target board 32 (FIG. 6), appearing as a checkered pattern in the lower portions of each of the figures. The wavelet coefficients are used to estimate the position of the vertices, and a simple diamond-shaped wavelet basis is used in the analysis.

Figure 9:
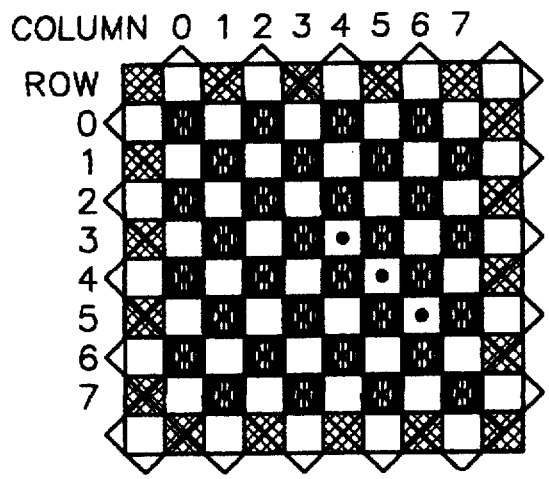
FIG. 9 is a diagrammatic representation of a boundary pattern representing boundary conditions established by a theoretical response of an imager to a target board with no disturbance present.
Figure 10:
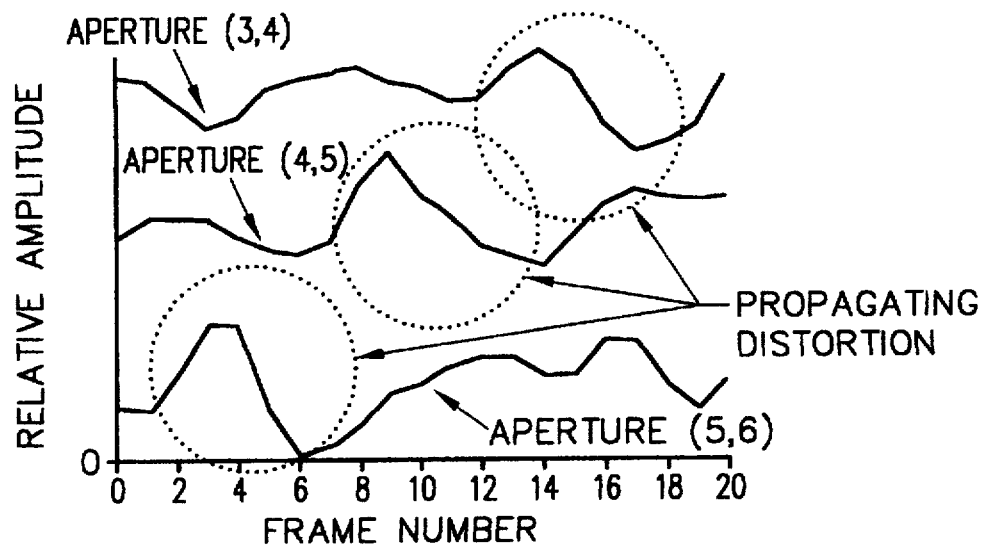
FIG. 10 is a graphical illustration of the propagation of a disturbance relative to time (frame number).

Continuing with a further description of the process, the theoretical response of the imager 36 to the target board 32 (FIG. 6) when no disturbance is present is used to establish the boundary conditions for the wavelet computation. FIG. 9 is a diagrammatic representation of the image analysis regions, with the boundary pattern being shown as lightly shaded in FIG. 9. Wavelet coefficients are computed for each of the diamond-shaped regions shown in FIG. 9. The wavelet coefficients for all 21 frames in the sequence for the apertures located at (5,6), (4,5), and (3,4) are shown in FIG. 10, which is a graphical representation of the propagation of thermal distortion. Target board aperture coordinates are given by (row, column) designation, and the apertures used for the data presented in FIG. 10 are marked with a black dot in FIG. 9. The propagation of the disturbance with respect to time (frame number) is readily apparent in FIG. 10. The characteristic shape of the first derivative of the Gaussian function is also observed. The four simulated frames discussed above and shown in FIGS. 5A–5D were generated using parameters estimated from the actual observed data from frames 1, 7, 13 and 19 of FIGS. 8A–8D discussed above.

The simulation and analysis methods worked well for the artificial turbulent distortion introduced in the first experiment. However, for naturally occurring atmospheric turbulence, the situation is more complicated. Natural turbulence can be expected to occur all along a horizontal path, and to vary considerably in scale and strength. Therefore, a second experiment was devised to determine whether or not the naturally occurring atmospheric turbulence could be characterized, analyzed and simulated using the techniques disclosed herein. Topological features in the boundary layer influence the onset of naturally occurring turbulent phenomena that affect horizontal path image propagation. Viewing over the top of small ridges or mounds greatly increases the magnitude of distortions from local turbulent phenomena compared to the remainder of the horizontal path.

Figure 11:
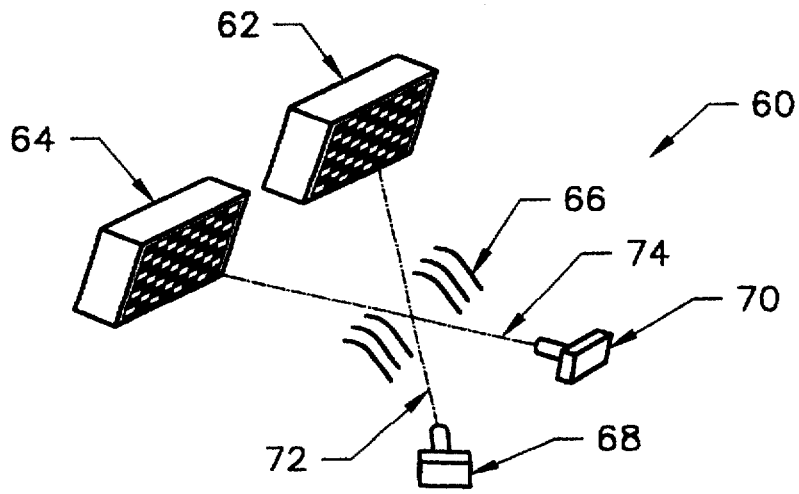
FIG. 11 is a diagrammatic representation of a modified experimental setup for detecting and isolating intermittent turbulence midway between two target boards and imagers.

FIG. 11 is a diagrammatic representation of an experimental setup modified to detect and isolate intermittent turbulence above a small earthen mound located approximately midway between two target boards and imagers. Specifically, as seen in FIG. 11, the experimental setup 60 comprises target boards 62 and 64 located on one side of earth mound 66 and corresponding IR imagers 68 and 70 located on the other side of earth mound 66. The earth mound 66 is, preferably, located midway between target boards 62 and 64, on the one hand, and imagers 68 and 70 on the other hand.

For an initial experiment using setup 60, imagers 68 and 70 were used to drive a virtual reality binocular headset (not shown), for example, a Model DK210 binocular headset manufactured by Virtual Vision Inc. Human observers and (if desired) video tape recorders were used to monitor the experiment over several days with variant conditions. Several data sets were acquired, such data sets containing very distinct turbulent distortions highly correlated in each of the imagers 68 and 70, thereby indicating that the disturbance occurred in the vicinity of the crossover of the optical paths 72 and 74, respectively. Analysis of data obtained with this experiment indicates that the experiment is particularly useful for data obtained when turbulent phenomena are intermittent and restricted to the relatively narrow region in the vicinity of the mound 66. Binocular imaging through intermittent turbulence of distant features on the horizon may also prove to be a valuable technique for passive crosswind sensing.

To summarize the aforementioned disclosure, early experimental results indicate that the use of Gaussian image warping functions is a promising method for realistically and efficiently simulating the dynamic effects of atmospheric turbulence on IR digital imagery. Parameters for turbulent disturbances along a horizontal path are generated with random processes appropriate to the terrain and weather conditions. These disturbances are then propagated in a direction of the prevailing wind velocity vector. Since shaded polygon computer graphic representations are commonly used for the various vehicles and features in an interactive simulation, the cumulative warping effect is applicable directly to the polygon vertices prior to conversion to raster (bit map) format. After conversion to raster format, the transfer function and noise characteristics of the imaging system are easily applied. The net effect is a simulation under turbulence that accurately captures the dynamic behavior, including such phenomena as intermittency and patches of superresolution.

Furthermore, preliminary results obtained from the stereo vision experiment (FIG. 11) indicate that, in addition to validating the dynamic simulation model, the technique may be useful for determining statistical parameters of actual atmospheric turbulent disturbances under certain topological and weather conditions, and for passive remote sensing of crosswind velocities.

While preferred forms and arrangements have been shown in illustrating the invention, it is to be understood that various changes and modifications may be made without departing from the spirit and scope of this disclosure.

We claim:

1. A method for simulating dynamic effects of atmosphere turbulence found along long horizontal paths, near the ground, on hot summer days on infrared digital imagery, comprising the steps of:

obtaining a sampled version of an object intensity distribution at real-time frame rates; and applying at least one spatially varying system to said object intensity distribution to obtain at least one image intensity distribution;

wherein said at least one spatially varying system simulates atmospheric turbulence which varies at least one of phase and amplitude as a function of a spatial index.

2. The method of claim 1, wherein said at least one spatially varying system is represented by a set of difference equations.

3. The method of claim 1, wherein said at least one spatially varying system is represented by a set of unit sample responses.

4. The method of claim 1, wherein said at least one spatially varying system is represented by a set of frequency responses.

5. The method of claim 1, wherein said at least one spatially varying system is represented by a plurality of regions of applicability.

6. The method of claim 1, wherein a relationship between said sampled version of an object intensity distribution and said at least one image intensity distribution is represented by a point spread function.

7. The method of claim 1, wherein a relationship between said sampled version of an object intensity distribution and said at least one image intensity distribution is represented by at least one image varying transformation.

8. The method of claim 1, wherein a relationship between said sampled version of an object intensity distribution and said at least one image intensity distribution is represented by a first derivative of a Gaussian distortion function.

9. A method for simulating dynamic effects of atmosphere turbulence found along long horizontal paths, near the ground, on hot summer days on infrared digital imagery, comprising the steps of:

obtaining a sampled version of an object intensity distribution at real-time frame rates; and applying at least one spatially varying system to said object intensity distribution to obtain at least one image intensity distribution;

wherein said at least one spatially varying system comprises a spatially varying low pass filter.

10. An experimental configuration for verifying utility of a turbulence simulation technique that simulates turbulence found along long horizontal paths, near the ground, on hot summer days, comprising:

thermal target board means for generating thermal radiation;

imaging means for receiving said thermal radiation from said thermal target board means and for generating a corresponding electrical signal;

heat source disturbance means disposed between said thermal target board means and said imaging means for generating a disturbance which affects thermal radiation passing between said thermal target board means and said imaging means; and processing means for processing said corresponding electrical signal generated by said imaging means to produce a digital image of said thermal radiation.

11. The configuration of claim 10 wherein said heat source disturbance means comprises a phase and amplitude screen.

12. The configuration of claim 10, wherein said imaging means comprises an infrared imager.

13. The configuration of claim 10, wherein said processing means comprises a low pass filter.

14. The configuration of claim 13, wherein said low pass filter has an output, and said processing means further comprises a video digitizer connected to the output of said low pass filter.

15. The configuration of claim 14, wherein said video digitizer has an output, and said processing means further comprises a microcomputer connected to the output of said video digitizer.

16. The configuration of claim 13, wherein said low pass filter comprises an anti-aliasing filter.

17. The configuration of claim 10, wherein said processing means comprises a video digitizer.

18. The configuration of claim 17, wherein said video digitizer has at least one of an adjustable gain and an adjustable offset.

19. The configuration of claim 10, wherein said processing means further processes said corresponding electrical signal to produce at least one reconstructed pattern of said thermal radiation.

20. The configuration of claim 19, wherein said processing means computes wavelet coefficients to estimate positions of vertices.

21. The configuration of claim 20, wherein said wavelet coefficients are computed for each of a plurality of image analysis regions.

22. The configuration of claim 20, wherein a thermal response of said imaging means to said target board means with no disturbance present is used to establish boundary conditions for computation of said wavelet coefficients.

23. The configuration of claim 10, wherein said thermal target board means comprises two thermal target boards and said imaging means comprises two imagers.

24. The configuration of claim 23, wherein said heat source disturbance means comprises an earth mound disposed between said two thermal target boards and said two imagers.

25. A method for simulating dynamic effects of atmospheric turbulence found along long horizontal paths, near the ground, on hot summer days on infrared digital imagery to remotely sense crosswinds, comprising the steps of:

obtaining a sampled version of an object intensity distribution; and applying at least one spatially varying system to said object intensity distribution to obtain at least one image intensity distribution;

wherein said at least one spatially varying system simulates intermittent turbulence restricted to a region on the order of the volume of the air mass with the index of refraction gradients causing the particular optical turbulence distortion feature.

* * * * *